US009630617B2

(12) United States Patent
Burtsche et al.

(10) Patent No.: US 9,630,617 B2
(45) Date of Patent: Apr. 25, 2017

(54) DECIDING ON THE DIRECTION OF TRAVEL IN THE EVENT OF A RESUMPTION OF MOVEMENT IN AN AUTOMATED PARKING PROCESS BY MEANS OF A PARKING ASSISTANCE SYSTEM

(71) Applicant: Bayerische Motoren Werke Aktiengesellschaft, Munich (DE)

(72) Inventors: Thomas Burtsche, Warngau (DE); Thomas Velten, Munich (DE); Rainer Schillinger, Munich (DE); Thomas Goldmann, Bayreuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/008,941

(22) Filed: Jan. 28, 2016

(65) Prior Publication Data

US 2016/0144858 A1 May 26, 2016

Related U.S. Application Data

(63) Continuation of application No. PCT/EP2014/066104, filed on Jul. 25, 2014.

(30) Foreign Application Priority Data

Jul. 29, 2013 (DE) .................. 10 2013 214 805

(51) Int. Cl.
*B60W 10/20* (2006.01)
*B60W 30/06* (2006.01)
(Continued)

(52) U.S. Cl.
CPC ............ *B60W 30/06* (2013.01); *B60W 10/18* (2013.01); *B60W 10/20* (2013.01);
(Continued)

(58) Field of Classification Search
CPC ...... B60W 30/06; B60W 10/20; B60W 10/18; B60W 2550/10; B60W 2710/18; B60W 2710/20
(Continued)

(56) References Cited

U.S. PATENT DOCUMENTS 6,081,206 A * 6/2000 Kielland ............ G06Q 30/0284
  194/902
7,366,595 B1 * 4/2008 Shimizu ................. B60K 35/00
  340/937

(Continued)

FOREIGN PATENT DOCUMENTS

CN 102030039 A 4/2011
CN 102762436 A 10/2012
(Continued)

OTHER PUBLICATIONS

International Search Report (PCT/ISA/210) issued in PCT Application No. PCT/EP2014/EP066104 dated Dec. 23, 2014 with English translation (Six (6) pages).
(Continued)

*Primary Examiner* — Richard Camby
(74) *Attorney, Agent, or Firm* — Crowell & Moring LLP

(57) ABSTRACT

A method is provided for resuming the movement of a motor vehicle after unforeseen stopping in an automated parking process performed by a parking assistance system having automated longitudinal and transverse guidance. If the vehicle is stopped, a decision is made about a resumption of movement of the vehicle in the prior direction of travel that existed before the vehicle was stopped. The decision is made in dependence on the remaining travel path from the current position to the next planned stopping point of the trajectory lying in the prior direction of travel. A stopping point of the trajectory can be a reversal point or the final parking position, for example. If the decision is positive, the movement of the vehicle is resumed in the prior direction of (Continued)

travel. If the decision is negative, the movement of the vehicle is resumed against the prior direction of travel. Alternatively, in the case of a negative decision, the movement of the vehicle may not be resumed and the parking process may be ended.

12 Claims, 1 Drawing Sheet

(51) Int. Cl.
  *B62D 15/02* (2006.01)
  *B60W 10/18* (2012.01)
(52) U.S. Cl.
  CPC ..... *B62D 15/0285* (2013.01); *B60W 2550/10* (2013.01); *B60W 2710/18* (2013.01); *B60W 2710/20* (2013.01)
(58) Field of Classification Search
  USPC .......................................................... 701/23
  See application file for complete search history.

(56) References Cited

U.S. PATENT DOCUMENTS

| | | | |
|---|---|---|---|
| 7,640,107 B2 * | 12/2009 | Shimizu | B60K 35/00 340/932.2 |
| 2011/0080304 A1 | 4/2011 | Toledo et al. | |
| 2013/0124041 A1 | 5/2013 | Belser et al. | |
| 2015/0073661 A1 | 3/2015 | Raisch et al. | |

FOREIGN PATENT DOCUMENTS

| | | |
|---|---|---|
| DE | 10 2007 002 265 A1 | 8/2008 |
| DE | 10 2007 049 965 A1 | 4/2009 |
| DE | 10 2010 002 105 A1 | 8/2011 |
| DE | 10 2011 086 210 A1 | 5/2013 |
| EP | 0 849 144 A2 | 6/1998 |
| GB | 2 453 850 A | 4/2009 |
| WO | WO 2012/041670 A1 | 4/2012 |

OTHER PUBLICATIONS

German-language Written Opinion (PCT/ISA/237) issued in PCT Application No. PCT/EP2014/EP066104 dated Dec. 23, 2014 (Six (6) pages).

German-language Office Action issued in counterpart German Application No. 10 2013 214 805.4 dated Apr. 10, 2014 (Six (6) pages).

Ahrens, "Parkassistant mit Laengs—und Querfuehrung [Parking assistant with longitudinal and transverse guidance]", 2012, Fifth Conference for Driver Assistance at Technical University of Muenchen, 2012 (Ten (10) pages).

Chinese Office Action issued in counterpart Chinese Application No. 201480049525.2 dated Jan. 4, 2017 with English translation (14 pages).

\* cited by examiner

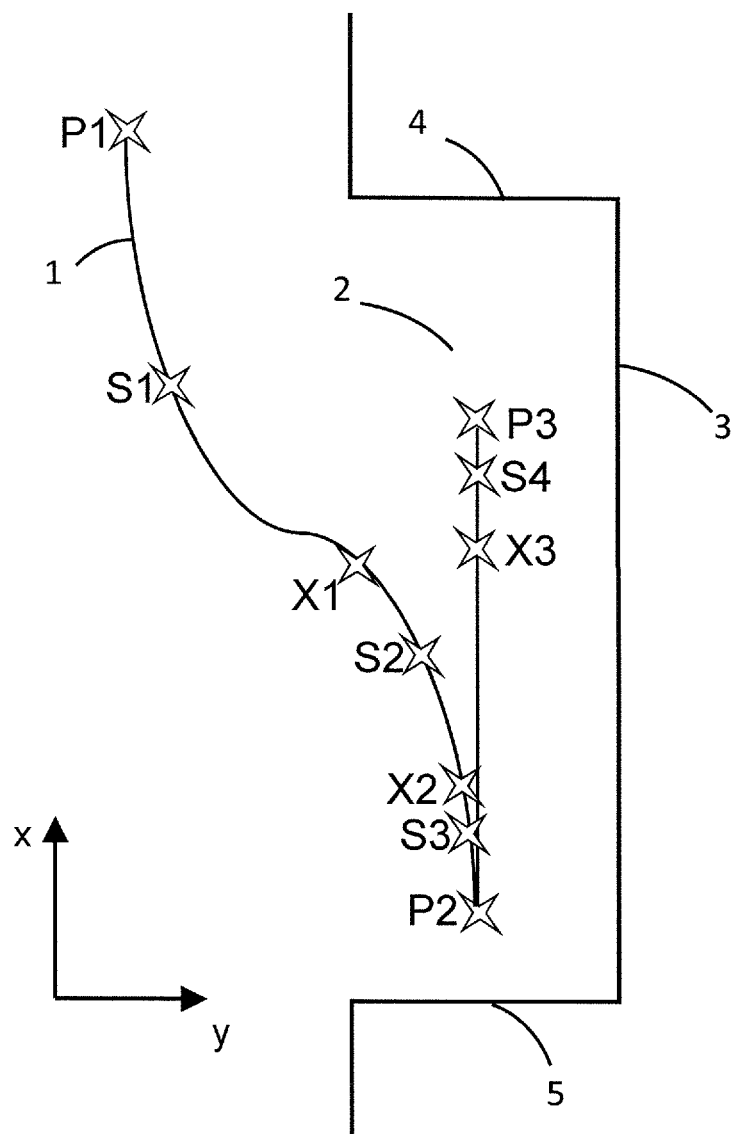

DECIDING ON THE DIRECTION OF TRAVEL IN THE EVENT OF A RESUMPTION OF MOVEMENT IN AN AUTOMATED PARKING PROCESS BY MEANS OF A PARKING ASSISTANCE SYSTEM

CROSS REFERENCE TO RELATED APPLICATIONS

This application is a continuation of PCT International Application No. PCT/EP2014/066104, filed Jul. 25, 2014, which claims priority under 35 U.S.C. §119 from German Patent Application No. 10 2013 214 805.4, filed Jul. 29, 2013, the entire disclosures of which are herein expressly incorporated by reference.

BACKGROUND AND SUMMARY OF THE INVENTION

The invention relates to the resumption of movement after unforeseen stopping in an automated parking process by means of a parking assistance system having automated longitudinal and transverse guidance.

In parking assistance systems having automated transverse guidance, the steering of the vehicle is controlled by the system during the parking-space-entering process. The longitudinal guidance has to be performed by the driver himself by corresponding acceleration and braking. In parking assistance systems having automated transverse and longitudinal guidance, the task of longitudinal guidance is also performed by the parking assistance system; the longitudinal movement of the motor vehicle is controlled by the parking assistance system. In parking assistance systems with transverse guidance and longitudinal guidance, the steering, the brakes and the vehicle drive are therefore controlled by the parking assistance system. In such parking assistance systems having automated transverse and longitudinal guidance, the driver generally has the possibility of being able to have the vehicle placed automatically in a parking space and optionally removed therefrom by activating an operator control element in the vehicle cockpit.

An exemplary parking assistance system having automated transverse and longitudinal guidance is described in document "Parkassistent mit Längs-und Querführung [Parking assistant with longitudinal and transverse guidance]". Dirk Ahrens, 5$^{th}$ conference for driver assistance at the TU München [Technical University of Munich], Munich, 2012, which can be found on the Internet, for example, at the link http:/www.ftm.mw.tum.de/uploads/media/21_Ahrens.pdf. When a vehicle is manually passing parked vehicles, a suitable longitudinal parking space is found by use of a lateral sensor system and said parking space is displayed visually to the driver on a display in the vehicle. The driver then confirms the parking space which has been found. If the driver is located in a valid starting corridor next to the front boundary object, from which there is a possible driving trajectory into a valid final parked position, the parking maneuver is activated by pressing and holding down a parking button and subsequently releasing the brake. After the parking maneuver has been activated, the vehicle parks backwards under automatic control of the steering and automatic control of the longitudinal movement into the longitudinal parking space in one or more maneuvering movements.

Between two successive maneuvering movements of the parking-space-entering trajectory there is in each case what is referred to as a reversal point (also referred to as a switching point) at which the direction of travel is changed from rearward to forward or from forward to rearward. In this respect, at the respective switching point the vehicle is automatically brought to a standstill by automatic activation of the brakes and the vehicle carries out a change of gear in the automatic transmission in order to change the direction of travel after the stationary state has been reached.

The parking-space-entering trajectory is planned after measurement of the parking space and results in one or more planned reversal points and a planned final parked position; it is also contemplated for the final parked position to be reached in a single maneuvering movement and for no reversal point to be included in the planning. Ideally, the vehicle carries out the trajectory as planned and stops briefly at the planned switching point in order to carry out a change of gear.

The vehicle can, however, also come to a standstill in an unforeseen way when the parking-space-entering trajectory is travelled along, for example in the event of interruption by the driver or in the event of an increased driving resistance.

The object of the invention is to improve the resumption of movement of the vehicle after it comes to a standstill in such an unforeseen way.

The object is achieved by a method for resuming the movement of a motor vehicle after unforeseen stopping in an automated parking process, as well as a parking assistance system having automated longitudinal and transverse guidance that carries out the method, in accordance with embodiments of the invention.

A first aspect of the invention relates to a method for resuming the movement of a motor vehicle after unforeseen stopping in an automated parking process, in particular in a reversing process for entering a longitudinal parking space (parallel to the direction of the road) by use of a parking assistance system with automated longitudinal and transverse guidance.

According to the method, in the event of the vehicle stopping, a decision is made about a resumption of movement of the vehicle in the previous direction of travel which existed before the vehicle was stopped. The decision is made according to a preferred refinement of the invention as a function of the remaining route from the current position up to the next planned stopping point, in the previous direction of travel, on the trajectory. A stopping point on the trajectory can be, for example, a reversal point or the final parked position. In the event of a positive decision, the movement of the vehicle is resumed in the previous direction of travel. In the event of a negative decision, the movement of the vehicle is resumed counter to the previous direction of travel. Alternatively, it is also contemplated that in the event of a negative decision the movement of the vehicle is not resumed and the parking process is ended.

The method according to the invention makes it possible to prevent a situation in which when the vehicle comes to a standstill in an unforeseen fashion shortly before a planned stopping point, the parking assistance system resumes the movement of the vehicle for a short distance in order then to initiate the change of direction of travel in the case of a reversal point as the stopping point, or to output the final position as having been reached in the case of the final parked position as a stopping point. As result, situations which are implausible from the driver's point of view can be avoided with a brief resumption of movement after the vehicle has come to a stationary state in an unforeseen fashion.

Alternatively or additionally, a decision about the resumption of movement of the vehicle in the previous direction of travel can also be made as a function of the presence of any obstacle in the previous direction of travel. If, for example, the previous direction of travel is blocked by an obstacle, the system automatically carries out a change of direction of travel and continues the parking maneuver in the opposite direction of travel.

The decision is preferably made as a function of the remaining route from the current position up to the next planned reversal point, in the previous direction of travel, on the trajectory, wherein in the event of a negative decision, the movement of the vehicle is started counter to the previous direction of travel.

In the case of stopping before the final parked position, the decision is made as a function of the remaining route from the current position up to the final parked position of the trajectory (if there is no planned reversal point between the current position and the final parked position on the trajectory). In the event of a negative decision, the movement of the vehicle is not resumed and the vehicle ends the parking process.

In order to make a decision about a resumption of movement of the vehicle in the previous direction of travel, a threshold value comparison of the remaining route from the current position up to the next planned stopping point, in the previous direction of travel, on the trajectory is preferably made with a threshold value which is greater than zero (for example 10 cm).

Within the scope of the threshold value comparison it is preferably checked whether the remaining route from the current position up to the next planned stopping point, in the previous direction of travel, on the trajectory is less than or less than or equal to the threshold value.

In the event of the remaining route being less than or less than or equal to the threshold value, the movement of the vehicle preferably counter to the previous direction of travel is started (if the vehicle stops just before a reversal point), or the movement of the vehicle is not resumed and the parking process is ended (if the vehicle stops just before the final parked position).

The threshold value is preferably in the range from 30 cm to 5 cm. The threshold value corresponds, for example, approximately to the value of 10 cm.

According to one further embodiment of the method, the method is used in a process of reversing into a longitudinal parking space. Within the scope of the method it is checked whether the vehicle has reached or passed a specific point on the parking-space-entering trajectory of the first maneuver movement for entering a parking space in the reverse direction. In the event of any obstacle being present in the previous direction of travel, the movement of the vehicle is resumed counter to the previous direction of travel if the specific point on the parking-space-entering trajectory has been reached or passed. The point on the parking-space-entering trajectory of the first maneuver movement for entering a parking space preferably corresponds to the point starting from which or after which an acceptable final parked position can be reached in the event of the movement being resumed counter to the previous direction of travel.

A second aspect of the invention relates to a parking assistance system having automated longitudinal and transverse guidance. The parking assistance system is configured to make a decision, in the event of unforeseen stopping in an automated parking process, about resumption of the movement of the vehicle in the previous direction of travel which existed before the vehicle was stopped. The decision is preferably made as a function of the remaining route from the current position up to the next planned stopping point, in the previous direction of travel, on the trajectory. The decision can alternatively or additionally be made as a function of the presence of any obstacle in the previous direction of travel. In the event of a positive decision, a resumption of the movement of the vehicle in the previous direction of travel is brought about by the system. In the event of a negative decision, a resumption of movement of the vehicle counter to the previous direction of travel is brought about or no resumption of movement is brought about (in either of the two directions of travel) and the parking process is ended.

The above statements regarding the inventive method according to the first aspect of the invention apply correspondingly also to the inventive parking assistance system according to the second aspect of the invention. At this point, advantageous exemplary embodiments of the system according to the invention which are not described explicitly correspond to the described advantageous exemplary embodiments of the inventive method.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a plan view of a schematic profile illustrating an exemplary parking-space-entering trajectory for a reversing parking-space-entering maneuver into a longitudinal parking space.

DETAILED DESCRIPTION OF THE DRAWING

FIG. 1 shows a schematic profile of an exemplary parking-space-entering trajectory 1 for a reversing parking-space-entering maneuver into a longitudinal parking space 2 in a plan view. The longitudinal parking space 2 is bounded in the y direction by a lateral boundary line 3, for example by a curbstone. In the x direction, the longitudinal parking space 2 is bounded by a front boundary line 4 and by a rear boundary line 5. The front boundary line 4 marks, for example, the rear of a front vehicle, and the rear boundary line 5 marks, for example, the front of a rear vehicle.

In the case of FIG. 1, the reference point of the vehicle for the parking-space-entering trajectory is, for example, the center of the rear axle of the vehicle. The parking-space-entering maneuver includes, for example, two maneuvering movements: a first maneuvering movement for entering a parking space in the reversing direction from the starting point P1 of the parking-space-entering trajectory 1 up to the reversal point P2, and a second maneuvering movement for entering a parking space in the forward direction from the reversal point P2 up to the final parked position P3.

After the measurement of the longitudinal parking space 2, the parking-space-entering trajectory 1 is planned; this results in one or more planned reversal points P2 and one planned final parked position P3. Ideally, the vehicle drives along the parking-space-entering trajectory as planned and stops at the planned reversal points P2. If the vehicle comes to a standstill in an unforeseen fashion shortly before a planned reversal point (for example owing to an interruption by the driver or as a result of a high driving resistance), a brief movement for a short distance in the previous direction of travel is then to be avoided.

For this purpose, the parking-space-entering trajectory 1 is divided into three areas.

1. The area of approaching the parking space 2 and of swinging into the parking space 2 within the first maneuvering movement for entering a parking space (area starting from the starting point P1 up to the point X1, without the point X1 itself):

If the parking process is interrupted in this 1st area (for example a vehicle stop occurs at the position S1), the maneuver for entering a parking space is continued after the resumption of movement in the previous direction of travel. If this is not possible, for example because an obstacle is detected in the driving path of the previous direction of travel owing to the ultrasonic sensor system, the parking process is aborted.

2. The area within the parking space 2 in which a preferred change of direction permits a final parked position which is to be newly planned but is acceptable to be reached (area starting from the point X1):

If the parking process is interrupted and the vehicle is stopped in this 2nd area and outside the partial areas under 3, the parking maneuver is, where possible, continued in the previous direction of travel.

If the parking process is interrupted in this 2nd area (for example at the position S2) and the previous direction of travel is blocked by an obstacle detected in the driving path by way of the ultrasonic sensor system, the system automatically carries out a change of direction of travel and continues the parking maneuver in the opposite direction of travel.

The point X1 on the parking-space-entering trajectory 2 of the first maneuvering movement for entering a parking space preferably corresponds to the point starting from which an acceptable final parked position can be reached in the event of resumption of movement counter to the previous direction of travel. The point X1 is defined, for example, in such a way that it corresponds to the earliest point on the parking-space-entering trajectory starting from which the entire vehicle is located at the level of the parking space 2 in the x direction, and at the same time the distance from the curbstone 3 does not exceed a specific threshold value (for example 50 cm). The entire vehicle is at the level of the parking space 2 in the x direction if the vehicle is located underneath the front boundary line 4 and above the rear boundary line 5 in the x direction. The right-hand front corner of the vehicle is then located, for example, underneath the front boundary line 4.

Starting from this point X1, an acceptable final parked position can be reached despite a preferred change of direction. This is characterized, for example, by the fact that in the final parked position the angle between the longitudinal direction of the vehicle and the lateral boundary line 3 is less than a specific threshold value (for example 1°), and the distance from the lateral boundary line 3 is in a specific range (for example greater than 0 cm and less than 40 cm).

Starting from the point X1, a preferred change of direction is therefore basically possible.

3. Partial areas within the 2nd area shortly before the planned reversal point P2 (area between the point X2 and the reversal point P2) or shortly before the planned final parked position P3 (region between X3 and P3):

If an unforeseen interruption in the parking process takes place in these partial areas of the 2nd area and the vehicle stops (for example at the point S3 or S4), the maneuver is continued in the opposite direction of travel (for example in the case of stopping at the point S3 shortly before the reversal point P2) or the end position is reached prematurely (for example in the case of stopping at the point S4 shortly before the planned final parked position P3). The reason for this is that otherwise when movement is started in the previous direction of travel after a short distance (for example several cm) it would be necessary to stop again; this is not plausible for the driver. The partial areas start, for example, from a residual travel distance of 10 cm up to the planned reversal point P2 or up to the planned final parked position P3. The two points X2 and X3 are therefore in each case located a fixed distance before the planned point P2 or P3 (for example 10 cm before).

A method has been described above in which in the event of the vehicle coming to a standstill during the parking-space-entering maneuver, before continued travel, a decision is made on the basis of the remaining planned route to the next stopping point and/or for the presence of an obstacle in the original direction, as to whether continued travel in the originally planned direction is appropriate. If this check has a positive result, movement is started in the previous direction, and otherwise a change of direction of travel is initiated before the movement is started, if this is possible in order to reach an acceptable final position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for resuming movement of a motor vehicle after unforeseen stopping in an automated parking process along a planned trajectory carried out by a parking assistance system having automated longitudinal and transverse guidance, the method comprising the acts of:
    in an event of a stopping of the vehicle, deciding about a resumption of movement of the vehicle in the previous direction of travel which existed before the vehicle was stopped:
        as a function of a length of a remaining route from a current position up to a next planned stopping point, in the previous direction of travel, on the trajectory
        in the event of a positive decision, resuming the movement of the vehicle in the previous direction of travel, and
        in the event of a negative decision:
        a) resuming the movement of the vehicle counter to the previous direction of travel or
        b) not resuming the movement of the vehicle and ending the parking process.

2. The method as claimed in claim 1, wherein:
    the decision is made as a function of the length of the remaining route from the current position up to a next planned reversal point, in the previous direction of travel, on the trajectory, and
    in the event of a negative decision, starting the movement of the vehicle counter to the previous direction of travel.

3. The method as claimed in claim 1, wherein:
    the decision is made as a function of the length of the remaining route from the current position up to a final parked position on the trajectory if there is no planned reversal point between the current position and the final parked position on the trajectory, and
    in the event of a negative decision, not resuming the movement of the vehicle and ending the vehicle parking process.

4. The method as claimed in claim 1, wherein in order to make a decision about a resumption of movement of the vehicle in the previous direction of travel which existed before the vehicle was stopped, a threshold value comparison of the length of the remaining route from the current position up to the next planned stopping point, in the previous direction of travel, on the trajectory is made with a threshold value which is greater than zero.

5. The method as claimed in claim 4, wherein within the scope of the threshold value comparison it is checked whether the length of the remaining route from the current position up to the next planned stopping point, in the previous direction of travel, on the trajectory is less than or less than or equal to the threshold value.

6. The method as claimed in claim 5, wherein
in the event of the length of the remaining route being less than or less than or equal to the threshold value, the movement of the vehicle counter to the previous direction of travel is started, or the movement of the vehicle is not resumed and the parking process is ended.

7. The method as claimed in claim 4, wherein the threshold value is a value in the range from 30 cm to 5 cm.

8. The method as claimed in claim 4, wherein the threshold value corresponds approximately to the value of 10 cm.

9. The method as claimed in claim 1, wherein:
the parking process is a process of reversing into a parking space,
within the scope of the method it is checked whether the vehicle has reached or passed a specific point on the parking-space-entering trajectory of the first maneuver movement for entering the parking space in the reverse direction,
and
in the event of a possible obstacle being present in the previous direction of travel, the movement of the vehicle is resumed counter to the previous direction of travel if this specific point on the parking-space-entering trajectory has been reached or passed.

10. The method as claimed in claim 8, wherein the point on the parking-space-entering trajectory corresponds to a point starting from which or after which an acceptable final parked position can be reached in the event of the movement of the vehicle being resumed counter to the previous direction of travel.

11. A parking assistance system having automated longitudinal and transverse guidance for a motor vehicle, comprising a control unit of the parking assistance system configured to execute a decision:
whether, in an event of unforeseen stopping in an automated parking process along a planned trajectory, to resume movement of the vehicle in the previous direction of travel which existed before the vehicle was stopped:
as a function of a length of the remaining route from the current position up to the next planned stopping point, in the previous direction of travel, on the trajectory,
in order to:
1) in the event of a positive decision, bring about resumption of the movement of the vehicle in the previous direction of travel, and
2) in the event of a negative decision, bring about resumption of the movement of the vehicle counter to the previous direction of travel or not to bring about resumption of the movement of the vehicle and to end the parking process.

12. A motor vehicle, comprising:
a parking assistance system having automated longitudinal and transverse guidance for a motor vehicle, comprising a control unit of the parking assistance system configured to execute a decision:
whether, in an event of unforeseen stopping in an automated parking process along a planned trajectory, to resume movement of the vehicle in the previous direction of travel which existed before the vehicle was stopped:
as a function of a length of the remaining route from the current position up to a next planned stopping point, in the previous direction of travel, on the trajectory,
in order to:
1) in the event of a positive decision, bring about resumption of the movement of the vehicle in the previous direction of travel, and
2) in the event of a negative decision, bring about resumption of the movement of the vehicle counter to the previous direction of travel or to end the parking process.

* * * * *